United States Patent
Arethens et al.

(10) Patent No.: US 12,541,029 B2
(45) Date of Patent: Feb. 3, 2026

(54) RNP NAVIGATION WITHOUT GNSS

(71) Applicant: THALES, Courbevoie (FR)

(72) Inventors: Jean-Pierre Arethens, Valence (FR); Warody Lombardi, Valence (FR); Vincent Chopard, Valence (FR)

(73) Assignee: THALES, Courbevoie (FR)

( * ) Notice: Subject to any disclaimer, the term of this patent is extended or adjusted under 35 U.S.C. 154(b) by 210 days.

(21) Appl. No.: 18/033,058

(22) PCT Filed: Oct. 5, 2021

(86) PCT No.: PCT/EP2021/077460
§ 371 (c)(1),
(2) Date: Apr. 20, 2023

(87) PCT Pub. No.: WO2022/089894
PCT Pub. Date: May 5, 2022

(65) Prior Publication Data
US 2023/0393283 A1 Dec. 7, 2023

(30) Foreign Application Priority Data
Oct. 29, 2020 (FR) ...................................... 2011071

(51) Int. Cl.
*G01S 19/07* (2010.01)
*G08G 5/00* (2025.01)
*G08G 5/76* (2025.01)

(52) U.S. Cl.
CPC .............. *G01S 19/071* (2019.08); *G08G 5/76* (2025.01)

(58) Field of Classification Search
CPC .. G01S 19/071; G01S 2205/03; G01S 5/0244; G01S 5/0278; G01S 5/14; G01S 13/785; G08G 5/76; G01C 21/20
See application file for complete search history.

(56) References Cited

U.S. PATENT DOCUMENTS 3,659,085 A    4/1972  Potter et al.
11,385,073 B2  7/2022  Riedinger et al.

FOREIGN PATENT DOCUMENTS

GB    2 003 691 A    3/1979

OTHER PUBLICATIONS

G. Battista, R. Kumar, E. Nossek and O. Osechas, "Placing LDACS-based ranging sources for robust RNP 1.0 accuracy en-route," 2017 IEEE/AIAA 36th Digital Avionics Systems Conference (DASC), St. Petersburg, FL, USA, 2017, pp. 1-9, doi: 10.1109/DASC.2017.8102135 (Year: 2017).*

(Continued)

*Primary Examiner* — Brian P Sweeney
(74) *Attorney, Agent, or Firm* — BakerHostetler

(57) ABSTRACT

A position of an aircraft is computed, associated with the radius of a sphere centered around the estimated position of the aircraft and within which the actual position of the aircraft is located with a probability equal to or greater than a predefined threshold. For this purpose, the computation is based on distances from radio transmitters each having a fixed position in a geographical reference frame. The positions of the radio transmitters are converted into a terrestrial reference system, before solving a system of equations linking, in the terrestrial reference system, the position of the aircraft and the positions of the radio transmitters. After solving the system of equations, the position of the aircraft is converted from the terrestrial reference system into the geographical reference frame.

16 Claims, 2 Drawing Sheets

(56) References Cited

OTHER PUBLICATIONS

Battista, et al., "Placing LDACS-based ranging sources for robust RNP 1.0 accuracy en-route", 2017 IEEE/AIAA 36th Digital Avionics Systems Conference (DASC), 2017.
vol. TSGC, Mar. 14, 2003 (Mar. 14, 2003), pp. 1-215, 3GPP2 Draft; C43-20000115-007 Fyigpsuser, 3rd Generation Partnership Project 2, 3GPP2, Retrieved from the Internet: http://ftp.3gpp2.org/TSGC/Working/200I/TSG-C_0101/W g4/Swg4.3/.
Berz, et al., "Can Current DME Support PBN Operations with Integrity?", Proceedings of the 26th International Technical Meeting of the Satellite Division of The Institute of Navigation (Ion GNSS+ 2013), 2013.
Performance-based Navigation (PBN) Manual, International Civil Aviation Organization, Fourth Edition, 2013, pp. I-(iv), I-(xvi).

* cited by examiner

RNP NAVIGATION WITHOUT GNSS

CROSS-REFERENCE TO RELATED APPLICATIONS

This application is a National Stage of International patent application PCT/EP2021/077460, filed on Oct. 5, 2021, which claims priority to foreign French patent application No. FR 2011071, filed on Oct. 29, 2020, the disclosures of which are incorporated by reference in their entirety.

FIELD OF THE INVENTION

The field of the invention relates to avionics in general, and to localization systems and methods used by a flight management system of an aircraft in particular.

BACKGROUND

Current air navigation regulations distinguish between multiple navigation categories. The first category is that referred to as "conventional" navigation, the oldest one: it involves using radio beacons to navigate from beacon to beacon. The second category relates to what is referred to as PBN navigation, which consists in using sensors to determine an airplane position and using this position to guide the airplane along a route defined based on waypoints. This type of navigation requires combining the computing of the position with the computing of an uncertainty (called 95% EPU).

PBN navigation itself is broken down into two distinct navigation concepts: 1) RNAV navigation: a route is defined with an associated precision performance level. Thus, for an RNAV 10 route, the navigation system is asked to allow servo-control of the route with 95% precision of +/−10 nautical miles (nm); and 2) RNP navigation, which requires, in addition to what is required for an RNAV route, a monitoring and alerting function ("On board Monitoring & alerting") for monitoring that the airplane stays in a corridor or "containment" of plus or minus (+/−) 2 nm around the route flown. It is generally associated with a probability of leaving the containment of 10^-5/h.

The invention lies in the field of RNP navigation. To be able to support this type of navigation, it is necessary to compute a position and to statistically characterize the performance of the positioning (for example through one or more indicators). A first example of an indicator consists in qualifying the positioning precision through a 95% estimate of its error: the EPU. This estimate is made assuming that there is no latent failure that could affect the computing of the position. Another example of an indicator makes it possible to qualify the integrity of the positioning with a certain probability through a protection radius around the computed position: the HIL. This confidence estimate is made assuming that there may be one (or more) latent failures affecting the measurements used, and takes into account the probability of occurrence of failures. RNP navigation is notably defined in the standard RTCA, Inc., *Minimum Operational Performance Standards for Global Positioning System/Wide Area Augmentation System Airborne Equipment*, RTCA DO-229D, Dec. 13, 2006 and by the document "ICAO Doc 9613 Performance-based Navigation (PBN) Manual", notably in paragraph 1.2.4.1 of this document. The concept of integrity for aeronautics is for its part defined by the standard RTCA, Inc., *Minimum Operational Performance Standards for Global Positioning System/Wide Area Augmentation System Airborne Equipment*, RTCA DO-229C, Nov. 28, 2001.

The RNP navigation principle was designed considering the use of a GNSS position that is provided with these two performance indicators. The implementation of RNP in airspaces is an important element for meeting the needs of air traffic growth.

Satellite localization and navigation systems, also referred to by the acronym GNSS, have become common tools in recent decades for supporting air operations in all flight phases of an aircraft, with a high level of performance and integrity.

However, these systems are based on satellite signals that are weak and are especially susceptible to interference or outages. GNSS service outages or interruptions remain a major concern in the industry. In order to generalize the use of RNP, it is necessary to protect against the risk of loss of the GNSS signal and to consider the ability to know how to perform this navigation at least partially with fallback systems in the event of GNSS signal loss.

This problem is not addressed in practice, and there is little literature on this subject. Positioning using DME radio beacons could be mentioned, but without making it possible to guarantee a performance level like navigation based on GNSS.

For example, the patent published under number GB2003691 describes real-time ground/on-board exchanges, which make it possible to establish an integrity diagnosis for a beacon. This approach exhibits limitations.

In the scientific literature, the descriptions of algorithms determining the location based on measurements of distance from DME radio beacons do not guarantee the integrity of the position used by the flight management systems and are insufficient to support RNP navigation. Current radio beacon positioning algorithms notably do not take into account the constraint of providing a protection radius around the position to support the requirements of RNP navigation. For example, the scientific publication Berz, G., Vitan, V., & Skyrda, I. (2013, September). Can Current DME Support PBN Operations with Integrity?. In *Proceedings of the 26th International Technical Meeting of the Satellite Division of The Institute of Navigation* (ION GNSS+2013) (pp. 233-250) describes some of the technical constraints that may be encountered to make it possible to support the requirements of RNP navigation through radio beacon-based positioning. However, it does not provide any practical solution to this problem. The documents Battista, G., Kumar, R., Nossek, E., & Osechas, O. (2017, September). Placing LDACS-based ranging sources for robust RNP 1.0 accuracy en-route. In 2017 *IEEE/AIAA 36th Digital Avionics Systems Conference (DASC)* (pp. 1-9). IEEE., U.S. Pat. No. 3,659,085 and 3GPP2 draft are known in the field of radio beacon and/or GPS navigation.

There is therefore a need for a navigation method based on the use of radio beacons that makes it possible to provide a guarantee with regard to the position of the aircraft compatible with RNP navigation.

SUMMARY OF THE INVENTION

To this end, one subject of the invention is a method implemented by a computer on board an aircraft, comprising: a first step of obtaining distances of the aircraft from at least four radio transmitters each having a fixed position in a geographical reference frame; a second step of converting the positions of the radio transmitters into a terrestrial reference system; a third step of defining, in matrix form, a system of redundant equations linking, in the terrestrial reference system, the position of the aircraft and the positions of the radio transmitters; a fourth step of solving said system of equations, in order to obtain an estimated position of the aircraft and a covariance matrix of the position error in the terrestrial reference system; a fifth step of converting the estimated position of the aircraft and the covariance matrix of the position error into the geographical reference frame; a sixth step of computing, based on the covariance matrix of the position error in the geographical reference frame, the radius of a sphere centered around the estimated position of the aircraft and within which the actual position of the aircraft is located with a probability equal to or greater than a predefined threshold.

Advantageously, the radio transmitters are radio beacons.

Advantageously, the radio transmitters are distance measuring equipment (DME) radio beacons.

Advantageously, the aircraft has a position in the terrestrial reference system defined by a vector of coordinates (x, y, z); each radio transmitter is defined by an index i, and has a position in the terrestrial reference system defined by a vector of 3 coordinates $(x_i, y_i, z_i)$; the position of each radio transmitter is linked to the position of the aircraft by the equation $d_i^2 = (x-x_i)^2 + (y-y_i)^2 + (z-z_i)^2$.

Advantageously, defining the system of redundant equations in matrix form consists in defining a system of equations in the form:

$$\underbrace{\begin{bmatrix} 1 & -2x_1 & -2y_1 & -2z_1 \\ 1 & -2x_2 & -2y_2 & -2z_2 \\ \vdots & \vdots & \vdots & \vdots \end{bmatrix}}_{H} \underbrace{\begin{bmatrix} x^2+y^2+z^2 \\ x \\ y \\ z \end{bmatrix}}_{X} = \underbrace{\begin{bmatrix} d_1^2 - x_1^2 - y_1^2 - z_1^2 \\ d_2^2 - x_2^2 - y_2^2 - z_2^2 \\ \vdots \end{bmatrix}}_{b}$$

Advantageously, the step of solving the system of equations uses a diagonal weighting matrix, comprising, for each distance measurement, an element of value equal to $$\frac{1}{2d_i \sigma_{d_i} + \sigma_{d_i}^2},$$

where: $d_i$ represents the distance between the aircraft and the radio transmitter of index i; $\sigma_{d_i}$ represents the standard deviation of the noise on the distance measurement $d_i$.

Advantageously, the step of solving the system of equations consists in a singular value decomposition, a QR decomposition, or a Moore-Penrose pseudo-inverse solution.

Advantageously, the sixth step consists in: for each radio transmitter of index i: performing all of the third to fifth steps with the system of equations in which the equation linking the position of the aircraft and the positions of said radio transmitters has been removed, in order to obtain an estimated position and a covariance matrix of the position error in the horizontal plane not taking into account said radio transmitter of index i; computing a difference between the covariance matrix of the position error in the horizontal plane and the covariance matrix of the position error in the horizontal plane not taking into account said radio transmitter of index i; computing a distance, in the horizontal plane, between the estimated position of the aircraft and the estimated position of the aircraft not taking into account said radio transmitter of index i; computing a radius of said sphere for said radio transmitter of index i, on the basis of said difference and of said distance; computing the radius of said sphere as the largest of said radii for each transmitter of index i.

Advantageously, the radius of said sphere for said radio transmitter of index i is computed by the following steps: computing the standard deviation $\sigma_i$ of a matrix $dP_i$ of the differences between the covariance matrix of the position error in the horizontal plane and the covariance matrix of the position error in the horizontal plane not taking into account said radio transmitter of index i, by applying the formula $\sigma_i = \sqrt{\max(\lambda(dP_i))}$ in which $(\lambda(dP_i))$ is the vector of eigenvalues of said difference matrix, and the function max( ) is a function returning the largest of the elements of the matrix; computing a threshold $TH_i$ equal to the multiplication of said standard deviation $\sigma_i$ of the difference matrix $dP_i$ by a first predefined constant T; if the distance $D_i$ in the horizontal plane between the position of the aircraft and the position of the aircraft without taking into account the transmitter of index i is lower than said threshold $TH_i$, computing the radius of said sphere for said radio transmitter of index i by applying the formula $TH_i + k\sqrt{\max(\lambda(P_{NEi}))}$, where k is a second predefined constant, and $\lambda(P_{NE\ i})$ is the vector of eigenvalues of the covariance matrix $P_{NEi}$ of the position error in the horizontal plane not taking into account said radio transmitter of index i; otherwise, computing the radius of said sphere for said radio transmitter of index i by applying the formula $D_i + k\sqrt{\max(\lambda(P_{NEi}))}$.

Advantageously, the first predefined constant T is obtained by applying the formula:

$$T^2 = F^{-1}\left(1 - \left(\frac{PFA}{m}\right), 1\right) = \left\{T^2 : F(T^2, 1) = \frac{PFA}{m}\right\};$$

the second predefined constant k is obtained by applying the formula: $k^2 = F^{-1}(1-PMD, 1)$; where: F is the probability density function of a distribution $\chi^2$ of degree 1; m is the number of radio transmitters; PFA is a target probability of false alarms for the detection of distance measurement errors; PND is a desired target probability of missed detections of distance measurement errors.

Advantageously, the method additionally comprises obtaining a distance of the aircraft from a virtual radio transmitter based on an atmospheric pressure measurement performed by a barometer on board the aircraft.

Advantageously, said virtual transmitter is located at the center of the Earth; an altitude of the aircraft is evaluated based on the measurement of the atmospheric pressure; the distance of the aircraft from the virtual radio transmitter is equal to the sum of the Earth's radius and the altitude of the aircraft.

Advantageously, the system of redundant equations comprises the additional equation: $x^2+y^2+z^2 = (z_{bt}+R_E)^2$ where: $z_{bt}$ represents the altitude of the aircraft; $R_E$ represents the Earth's radius, at the position of the aircraft.

Advantageously, defining the system of redundant equations in matrix form consists in defining a system of equations in the form:

$$\underbrace{\begin{bmatrix} 1 & -2x_1 & -2y_1 & -2z_1 \\ 1 & -2x_2 & -2y_2 & -2z_2 \\ \vdots & \vdots & \vdots & \vdots \\ 1 & 0 & 0 & 0 \end{bmatrix}}_{H} \underbrace{\begin{bmatrix} x^2+y^2+z^2 \\ x \\ y \\ z \end{bmatrix}}_{X} = \underbrace{\begin{bmatrix} d_1^2 - x_1^2 - y_1^2 - z_1^2 \\ d_2^2 - x_2^2 - y_2^2 - z_2^2 \\ \vdots \\ (z_{bt} + R_E)^2 \end{bmatrix}}_{b}$$

Another subject of the invention is a computer program comprising program code instructions recorded on a computer-readable medium, said program code instructions being configured, when said program runs on a computer, to execute a method according to one of the embodiments of the invention.

Another subject of the invention is a flight management system for an aircraft, comprising computing means configured to execute a method according to one of the embodiments of the invention.

BRIEF DESCRIPTION OF THE DRAWINGS

Other features, details and advantages of the invention will become apparent on reading the description given with reference to the appended drawings, which are given by way of example and in which, respectively.

DETAILED DESCRIPTION

Figure 1:
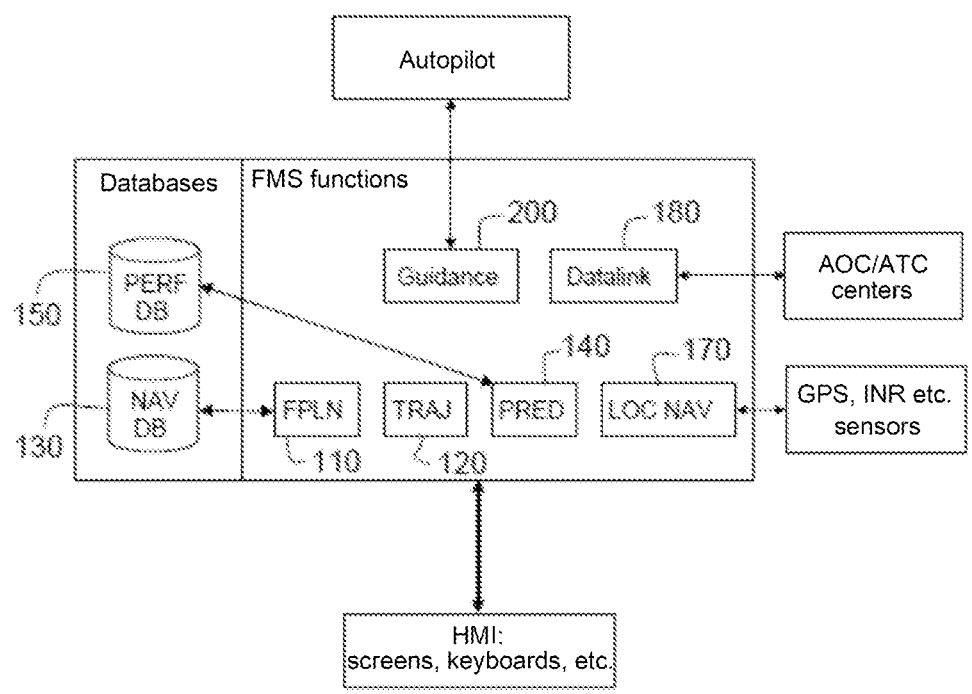
FIG. 1 shows one example of an FMS system in which the invention may be implemented.

Some acronyms commonly used in the technical field of the present application may be used in the description. These acronyms are listed in the table below, notably with their English expression and their meaning.

TABLE 1

| Acronym | Expression | Meaning |
| --- | --- | --- |
| DB | DataBase | Database. Container for storing and retrieving all information related to an activity. Generally in computerized form. |
| DME | Distance Measuring Equipment | Distance Measuring Equipment. Radio transponder for ascertaining the distance of an aircraft to a navigation database. Generally used in combination with a VOR for air navigation. |
| ECEF | Earth Centered, Earth Fixed | Earth Centered, Earth Fixed. Cartesian geographical coordinate system, defined by three orthonormal axes X, Y, Z, the origin of which is located at the center of the Earth, and the axes of which are aligned with the geographical poles of the Earth, and the international reference meridian. |
| EPU | Estimated Position Uncertainty | Estimated Position Uncertainty. Defines a horizontal distance around the estimated position of the aircraft, defining an area within which the aircraft has a 95% probability of being located equal to a predefined threshold. When this position is worked out by a positioning system of the aircraft using a triangulation principle based on measurements of radionavigation signals transmitted by beacons the position of which is known, the value of the EPU is dependent on the statistics of the measurement errors on the signals, as well as the relative position of the measurements. |
| FPLN | Flight Plan | Flight plan. Description of the flight followed by the aircraft, and notably the waypoints describing the route thereof. |
| FMD | Flight Management Display | Display, in a cockpit, of Flight Management data in the form of pages or windows. System for displaying data supplied by an FMS system. |
| FMS | Flight Management System | Flight Management System. Computerized system for computing trajectories and flight plans for aircraft, and for providing guidance instructions adapted to the operator or autopilot to follow the computed trajectory. |
| GNSS | Global Navigation Satellite System | Geolocation and Navigation by a Satellite System. Set of components based on a constellation of artificial satellites for providing a user, via a small portable receiver, with their 3D position, their 3D speed and the time. |
| GPS | Global Positioning System | Global Positioning System. Satellite positioning system. |
| HIL | Horizontal Integrity Limit | Horizontal Integrity Limit. Defines the radius of a circle around the current position worked out by a positioning system of the aircraft using radio navigation signal measurements within which it is guaranteed that the true position of the aircraft is located with a given probability, including in the event of abnormal errors on the signals used due to the system that creates them and that would have a higher probability of occurrence than the desired probability. For the positioning of aircraft using the GPS system, it is generally sought to have a position integrity better than $1-10^{-7}$/h. |
| KCCU | Keyboard Cursor Console Control Unit | Keyboard Cursor Control Unit. Human-Machine Interface able to be integrated into a cockpit, comprising a keyboard so that the operator is able to enter information into the FMS. |
| MCDU | Multi-purpose Control Display Unit | Multifunction Display Unit. Human-Machine Interface able to be integrated into a cockpit, allowing the display and entry of numerous information related to the FMS. |
| ND | Navigation Display | Navigation Screen. Cockpit display element showing in particular the lateral flight trajectory. |
| NDB | Non directional Beacon | Radio navigation beacon for determining the direction between an aircraft and the beacon, the position of which is known. |
| NED | North East Down | North East Down. Reference system in which the position of a point with respect to the Earth is defined by a latitude, a longitude, and a negative altitude. |
| NEU | North East Up | North East Up. Reference system in which the position of a point with respect to the Earth is defined by a latitude, a longitude, and a positive altitude. |
| PBN | Performance Based Navigation | Performance Based Navigation. Type of navigation consisting in using sensors to determine an airplane position and using this position to guide the airplane along a route, while complying with a set of criteria defining the faithfulness of the route following. |
| RNAV | Area NAVigation | Area navigation. Instrument flight method in which an aircraft is able to use any trajectory within a network of waypoints. |
| RNP | Required Navigation Performance | Required Navigation Performance. Navigation requirement specifying the 3D points accessible to an aircraft while flying a trajectory. Generally speaking, it consists of a distance tolerance with respect to a set of 3D points forming a predicted trajectory. RNP navigation is defined in the standard "RTCA DO 236 MINIMUM AVIATION SYSTEM PERFORMANCE STANDARDS: REQUIRED NAVIGATION PERFORMANCE FOR AREA NAVIGATION" and by "ICAO Doc 9613 Performance-based Navigation (PBN) Manual". |
| RNP | Required Navigation Performance | Required Navigation Performance. Navigation requirement specifying the 3D points accessible to an aircraft while flying a trajectory. Generally speaking, it consists of a distance tolerance with respect to a set of 3D points forming a predicted trajectory. |
| VD | Vertical Display | Vertical Display. Display element able to be integrated into a cockpit, and displaying the reference profile and the vertical joining profile of the aircraft. |
| VHF | Very High Frequency | Very High Frequency. Portion of the radio spectrum from 30 MHz to 300 MHz. |
| VOR | VHF Omnidi- | Radio positioning system used in air navigation and operating with VHF frequencies. |

TABLE 1-continued

| Acronym | Expression | Meaning |
|---|---|---|
| | rectional Range | |

Some acronyms commonly used in the technical field of the present application may be used in the description. These acronyms are listed in the table below, notably with their meaning.

TABLE 2

| PFA | Probability of false alarm | The PFA is the maximum probability of a positioning system that seeks to detect abnormal errors on the measurements used to work out the position raising an alarm while the measurements are not marred by abnormal errors. |
|---|---|---|
| PND | Probability of non-detection | The PND is the maximum probability of a positioning system that seeks to detect abnormal errors on the measurements used to work out the position not raising an alarm while at least one of the measurements used is marred by an abnormal error. |

DETAILED DESCRIPTION OF THE INVENTION

FIG. 1 shows one example of an FMS system in which the invention may be implemented.

A flight management system may be implemented by at least one computer on board an aircraft or on board a ground station. According to various embodiments of the invention, this may be a flight management system for various types of aircraft, for example an airplane, a helicopter or a drone.

The FMS 100 notably determines a geometry of a flight plan profile followed by the aircraft. The trajectory is computed in four dimensions: three spatial dimensions and a time/speed profile dimension. The FMS 100 also transmits, to the operator, via a first operator interface, or to the autopilot, guidance instructions computed by the FMS 100 to follow the flight profile. The operator may be located in the aircraft, for example if the aircraft is an airplane or a helicopter, or else on the ground, for example if the aircraft is a drone.

A flight management system may comprise one or more databases such as the database PERF DB 150, and the database NAV DB 130. For example, the database PERF DB 150 may contain aerodynamic parameters of the aircraft, or else features of the engines of the aircraft. It contains notably the performance margins applied systematically in the prior art to guarantee safety margins on the descent and approach phases. The database NAV DB 130 may for example contain the following elements: geographical points, beacons, air routes, departure procedures, arrival procedures, altitude constraints, speed constraints or slope constraints, etc.

The management of a flight plan according to the prior art may invoke means allowing the aircraft flight crew to create/modify a flight plan through one or more human-machine interfaces, for example:
 the MCDU;
 the KCCU;
 the FMD;
 the ND;
 the VD.

This flight plan creation/modification may for example comprise the loading of procedures by the operator, along with the selection of a procedure to be added to the current flight plan.

The FMS 100 comprises a flight plan management module 110, usually called FPLN. The module FPLN 110 notably makes it possible to manage various geographical elements forming a skeleton of a route to be followed by the aircraft comprising: a departure airport, waypoints, air routes to be followed, an arrival airport. The module FPLN 110 also makes it possible to manage various procedures forming part of a flight plan such as: a departure procedure, an arrival procedure. The FPLN 110 capability makes it possible notably to create, modify and delete a primary or secondary flight plan.

The flight plan and its various information related notably to the corresponding trajectory computed by the FMS may be displayed for consultation by the flight crew using display devices, also called human-machine interfaces, which are present in the cockpit of the aircraft, such as an FMD, an ND, a VD.

The module FPLN 110 uses data stored in databases NAV DB 130 to construct a flight plan and the associated trajectory.

The FMS 100 also comprises a module TRAJ 120 for computing a lateral trajectory for the flight plan defined by the module FPLN 110. The module TRAJ 120 notably constructs a continuous trajectory from points of an initial flight plan while at the same time complying with the performance of the aircraft as supplied by the database PERF DB 150. The initial flight plan may be an active flight plan or a secondary flight plan. The continuous trajectory may be presented to the operator by way of one of the human-machine interfaces.

The FMS 100 also comprises a trajectory prediction module PRED 140. The module PRED 140 notably constructs an optimized vertical profile from the lateral trajectory of the aircraft as supplied by the module TRAJ 120. To this end, the module PRED 140 uses the data from the first database PERF DB 150. The vertical profile may be presented to the operator by way of a VD, for example.

The FMS 100 also comprises a localization module 170, called LOCNAV in FIG. 1. The module LOCNAV 170 notably performs optimized geographical localization, in real time, of the aircraft on the basis of geolocation means on board the aircraft.

The FMS 100 also comprises a data link module 180, called DATA LINK in FIG. 1. The module DATA LINK 180 makes it possible to communicate with operators on the ground, for example in order to transmit a predicted trajectory of the aircraft, or to receive constraints on the trajectory, such as the predicted position of other aircraft or altitude constraints.

The FMS 100 also comprises a guidance module 200. The guidance module 200 notably supplies, to the autopilot or to one of the human-machine interfaces, appropriate commands for guiding the aircraft in lateral and vertical geographical planes (altitude and speed) so that said aircraft follows the trajectory planned in the flight plan.

The guidance algorithms implement automations that take, as input, an active trajectory or flight plan element and the position measured by one or more sensors of the aircraft. These guidance instructions generally comprise a) a roll instruction, a roll angular speed or a trajectory segment for guidance in the horizontal plane; b) an attitude, an attitude delta, a pitch angular speed, a load factor, a vertical acceleration, a vertical speed, a slope, or a trajectory segment in the vertical plane; c) a speed, an acceleration, a total energy, an engine instruction, a temporal objective of time for the speed guidance.

Figure 2:
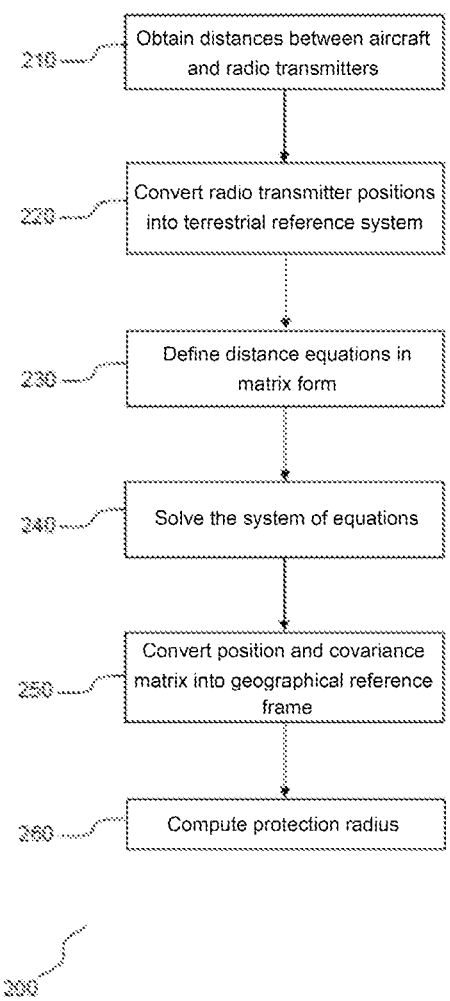
FIG. 2 shows one example of a method according to one set of embodiments of the invention.

FIG. 2 shows one example of a method according to one set of embodiments of the invention.

One of the aims of the method 200 is to provide an aircraft with the ability to follow an RNP flight procedure even in the event of loss of GNSS signals. The method 200 is a method implemented by at least one computer on board the aircraft. It may for example be implemented by the system 100.

An RNP flight procedure is particularly demanding in terms of aircraft guidance. An RNP procedure is characterized by:
  i) the ability to navigate according to a flight plan comprising flight plan points ("waypoints" defined in the database), and not according to beacons on the ground,
  ii) along an RNP half-width corridor within which the aircraft must be located 95% of the time and a 2*RNP half-width containment corridor (with a "buffer", that is to say a margin),
  iii) the need to estimate, on board, the localization performance of the aircraft and
  iv) the implementation of an on-board monitoring device comparing the localization performance with the performance required on the procedure in the database.

The method 200 comprises a first step 210 of obtaining distances of the aircraft from at least four radio transmitters each having a fixed position in a geographical reference frame.

In practice, this step consists in determining, for each of the at least 4 radio transmitters respectively, the distance of the aircraft from the radio transmitter. With each of the radio transmitters having a fixed position, this information makes it possible, as will be seen in the remainder of the description, to position the aircraft with respect to the Earth's surface. Preferably, the positions of the radio transmitters may be distinct from one another.

Each position of each radio transmitter is known in a geographical reference frame. A geographical reference frame is a reference frame defined by a latitude, a longitude, and an altitude. In particular, in the context of the invention, the positions of the radio transmitters may be known in the NED or NEU reference frames.

The radio transmitters may be of various types. They may be for example a radio communication antenna, such as 4G or 5G communication antennas, or navigation radio beacons. For example, the radio transmitters may be passive beacons transmitting NDB or VOR signals or active beacons such as DME transponders that retransmit the interrogation signals sent to them with a fixed delay.

In practice, the position of the aircraft with respect to each radio transmitter may be obtained in various ways, depending on the type of radio transmitter. For example, the radio transmitter may transmit signals comprising a transmission time. Upon reception of the signal by the aircraft, a reception time may be noted. The difference between the reception and transmission times indicates the time of flight of the radio signal, from which the position is able to be deduced.

In other cases, for example in the case of DME radio beacons, the radio transmitter of the interrogator of the airplane is coupled to a receiver; the aircraft transmits a coded radio signal to a given beacon; upon reception by the transponder of the interrogated ground beacon, the signal is decoded, and a return signal is sent by the radio transmitter of the transponder. When this return signal is received by the interrogator of the aircraft, it is able to compute the time elapsed between the transmission of the first signal and the reception of the return signal. This time therefore corresponds to a round trip of a radio wave between the aircraft and the radio beacon, plus the processing time taken by the radio beacon. It is therefore possible to deduce, from this information, the distance between the aircraft and the radio beacon. This operation has the advantage of obtaining a reliable value of the distance between the aircraft and the radio beacon, without having to synchronize the clocks between the aircraft and the radio beacon.

The method 200 comprises a second step 220 of converting the positions of the radio transmitters into a terrestrial reference system.

This step consists in converting the fixed positions of the transmitters from their geographical reference frame (for example NEU or NED, in which the position is defined by a latitude, a longitude and an altitude) into a terrestrial reference system.

The terrestrial reference system is a geocentric coordinate system, in which a position is defined by 3 distances, generally denoted x, y, z, from the center of the Earth in a fixed reference frame defined by 3 orthonormal axes. These coordinates are also defined by the acronym ECEF.

According to various embodiments of the invention, the radio transmitters that are used may be obtained in various ways. For example, radio transmitters whose signal is picked up by the aircraft may be used.

For example, if the radio transmitters are DME radio beacons, visible beacons are used.

However, in some situations, for example when approaching an airport, the aircraft may have access to a large number of DME radio beacons, for example more than 40. In this case, a large number of combinations of beacons is possible, some allowing more precise localization. In order to make it possible to benefit from the best localization precision, the applicant has filed French patent application no. FR 1871548, which makes it possible to obtain, for a given position of the aircraft, a list of DME radio beacons allowing the best precision with regard to the position of the aircraft.

In one set of embodiments of the invention, the distances of the aircraft from the radio transmitters may be supplemented with an additional distance from a virtual transmitter, determined based on the atmospheric pressure computed by a barometer on board the aircraft.

Using this virtual transmitter provides multiple advantages:
  this makes it possible to obtain an additional distance measurement, making it possible to improve the precision in terms of computing the position of the aircraft;
  when only four radio transmitters are visible, using an additional virtual transmitter makes it possible to obtain 5 distances from 5 different points. This minimum value of 5 distances is generally accepted as making it possible to obtain a reliable position;
  if one of the measurements of distance from the radio transmitter is imprecise, computing the distance from the virtual radio transmitter makes it possible to replace this with a more precise measurement.

In one set of embodiments of the invention:
  said virtual transmitter is located at the center of the Earth;
  an altitude of the aircraft is evaluated based on the measurement of the atmospheric pressure;
  the distance of the aircraft from the virtual radio transmitter is equal to the sum of the Earth's radius and the altitude of the aircraft.

In practice, this consists in defining a virtual radio transmitter having a fixed position at the center of the Earth, the aircraft being at a distance from this transmitter equal to:

$$Z = R_E + z_{bt}$$

Where Z is the distance between the aircraft and the virtual radio transmitter, $R_E$ is the Earth's radius (more precisely the radius of the WGS84 geoid at the current position of the aircraft), and $z_{bt}$ is the altitude of the aircraft, estimated on the basis of the measurements performed by the barometer. Obtaining an altitude of the aircraft based on on-board barometer measurements is well known to those skilled in the art, and is based on the principle according to which atmospheric pressure decreases with altitude, and that it is therefore possible to determine altitude directly based on atmospheric pressure.

The method 200 then comprises a third step 230 of defining, in matrix form, a system of redundant equations linking, in the terrestrial reference system, the position of the aircraft and the positions of the radio transmitters.

In practice, this step consists in defining a system of redundant equations linking:
- The position of the aircraft, represented by a vector of 3 ECEF coordinates (x, y, z);
- To each position of the radio transmitters in ECEF coordinates, each radio transmitter being associated with an index i, the position of a transmitter of index i being defined by the vector of 3 coordinates $(x_i, y_i, z_i)$, and the geometric distance, obtained beforehand, between the aircraft and this transmitter, denoted $d_i$.

Each equation linking the position of the aircraft to the position of a radio transmitter i may then be written:

$$D_i^2 = (x-x_i)^2 + (y-y_i)^2 + (z-z_i)^2$$

This system of equations may be defined in matrix form, as follows:

$$\underbrace{\begin{bmatrix} 1 & -2x_1 & -2y_1 & -2z_1 \\ 1 & -2x_2 & -2y_2 & -2z_2 \\ \vdots & \vdots & \vdots & \vdots \end{bmatrix}}_{H} \underbrace{\begin{bmatrix} x^2+y^2+z^2 \\ x \\ y \\ z \end{bmatrix}}_{X} = \underbrace{\begin{bmatrix} d_1^2 - x_1^2 - y_1^2 - z_1^2 \\ d_2^2 - x_2^2 - y_2^2 - z_2^2 \\ \vdots \end{bmatrix}}_{b}$$

It will be noted here that the matrix H is constant, since the positions $(x_i, y_i, z_i)$ of each radio transmitter are constant.

This formalization of the system of equations therefore makes it possible to seek an estimate $\hat{X}$ of the vector X containing the coordinates of the aircraft by solving the system.

$$\underbrace{\begin{bmatrix} 1 & -2x_1 & -2y_1 & -2z_1 \\ 1 & -2x_2 & -2y_2 & -2z_2 \\ \vdots & \vdots & \vdots & \vdots \end{bmatrix}}_{H} \underbrace{\begin{bmatrix} x^2+y^2+z^2 \\ x \\ y \\ z \end{bmatrix}}_{X} = \underbrace{\begin{bmatrix} d_1^2 - x_1^2 - y_1^2 - z_1^2 \\ d_2^2 - x_2^2 - y_2^2 - z_2^2 \\ \vdots \end{bmatrix}}_{b}$$

In which $d_i = D_i + \varepsilon_i$ is the value of the distance measurement to the station i performed by the interrogator of the airplane, $D_i$ is the geometric distance between the aircraft and each radio transmitter as obtained in step 210, and $\varepsilon_i$ is the value of the error marring the measurement $d_i$.

The conversion, in step 220, of the coordinates of the radio transmitters from a geographical reference frame to a terrestrial reference system thus makes it possible to define a system of redundant equations linking the position of the aircraft to the fixed positions of the radio transmitters.

As indicated above, in one set of embodiments of the invention, a virtual radio transmitter is defined based on barometric measurements. In this case, an additional equation is added to the system of redundant equations, linking the position of the aircraft to this virtual transmitter. The virtual transmitter is located at the center of the Earth, and therefore at the point with coordinates (0,0,0). Its distance from the aircraft, equal to the altitude of the aircraft plus the Earth's radius, is: $z_{bt} + R_E$. The additional equation linking the position of the aircraft to that of this transmitter is therefore written:

$$x^2 + y^2 + z^2 = (z_{bt} + R_E)^2$$

The system of equations in matrix form therefore then becomes:

$$\underbrace{\begin{bmatrix} 1 & -2x_1 & -2y_1 & -2z_1 \\ 1 & -2x_2 & -2y_2 & -2z_2 \\ \vdots & \vdots & \vdots & \vdots \\ 1 & 0 & 0 & 0 \end{bmatrix}}_{H} \underbrace{\begin{bmatrix} x^2+y^2+z^2 \\ x \\ y \\ z \end{bmatrix}}_{X} = \underbrace{\begin{bmatrix} d_1^2 - x_1^2 - y_1^2 - z_1^2 \\ d_2^2 - x_2^2 - y_2^2 - z_2^2 \\ \vdots \\ (z_{bt} + R_E)^2 \end{bmatrix}}_{b}$$

The method 200 then comprises a step 240 of solving said system of equations, in order to obtain an estimated position of the aircraft and a covariance matrix of the position error in the terrestrial reference system.

Generally speaking, those skilled in the art are aware of many ways of solving a system of matrix equations in order to obtain an estimate of a state vector and an error covariance matrix. In practice, this consists in obtaining an estimated state vector $\hat{X}$, and the associated error covariance matrix.

For example, this step may consist in applying a singular value decomposition defining matrices U, S and V with:

$$WH = USV^T$$

Where W is a weighting matrix defined by:

$$W = \begin{bmatrix} \frac{1}{2D_1\sigma_{d_1} + \sigma_{d_1}^2} & & & \\ & \ddots & & \\ & & \frac{1}{2D_i\sigma_{d_i} + \sigma_{d_i}^2} & \\ & & & \ddots \\ & & & & \frac{1}{2D_N\sigma_{d_N} + \sigma_{d_N}^2} \end{bmatrix}$$

In which:
- $D_i$ represents the distance between the aircraft and the (real or virtual) radio transmitter of index i between 1 and N (number of distance measurements used), obtained in step 210;
- $\sigma_{d_i}$ represents the standard deviation of the noise on the distance measurement $d_i$.

If a virtual radio transmitter based on barometric measurements is used, the matrix W therefore becomes:

$$W = \begin{bmatrix} \frac{1}{2D_1\sigma_{d_1} + \sigma_{d_1}^2} & & & \\ & \ddots & & \\ & & \frac{1}{2D_i\sigma_{d_i} + \sigma_{d_i}^2} & \\ & & & \ddots \\ & & & & \frac{1}{2(z_{bt} + R_E)\sigma_Z + \sigma_Z^2} \end{bmatrix}$$

Once the singular value decomposition U, S, V has been performed:

The estimated state vector, defining the estimated position of the aircraft, may be obtained using the following equation:

$$\tilde{X} = VS^{-1}U^T Wb$$

The covariance matrix P of the position error, expressed in the ECEF reference frame, is obtained by:

$$P = VS^{-2}V$$

Other ways of solving the system of equations are possible.

For example, the system of equations may be solved using a QR decomposition known to those skilled in the art, with the weighting matrix W defined above. In this decomposition: WH=QR where Q is an orthogonal matrix such that $Q^T = Q^{-1}$ and R is an upper triangular matrix.

It is then possible to iteratively solve the position by $R\tilde{X} = Q^T Wb$ and obtain the covariance matrix P of the position error in the ECEF reference frame by: $P = R^{-1}(R^{-1})^T$.

The solution of the system may also use the Moore-Penrose pseudo-inverse using the same weighting matrix W, and compute the position by $\tilde{X} = (H^T W^2 H)^{-1} H^T W^2 b$; The covariance matrix of the position error in the ECEF reference frame then has the expression $P = (H^T W^2 H)^{-1}$.

The method 200 then comprises a step 250 of converting the estimated position of the aircraft and the covariance matrix of the position error into the geographical reference frame.

This step consists in converting the estimated position $\tilde{X}$ and the covariance matrix obtained in the terrestrial reference system into geographical coordinates. For example, this may consist in converting the estimated position $\tilde{X}$ in the ECEF reference frame into an estimated position $\tilde{X}_{ned}$ using a method well known to those skilled in the art, and the covariance matrix P in the ECEF reference frame into a covariance matrix $P_{NED}$ in the NED reference frame.

The covariance matrix may have its reference frame changed via a conversion matrix for converting from the ECEF reference frame to the NED reference frame:

$$M_{ecef2ned} = \begin{bmatrix} -\sin(lat)\cos(lon) & -\sin(lat)\sin(lon) & \cos(lat) \\ -\sin(lon) & \cos(lon) & 0 \\ -\cos(lat)\cos(lon) & -\cos(lat)\sin(lon) & -\sin(lat) \end{bmatrix}$$

In which lat represents the latitude of the aircraft, and lon represents its longitude.

The covariance matrix $P_{NED}$ in the NED reference frame is then obtained by:

$$P_{NED} = M_{ecef2ned} P M_{ecef2ned}^T = \begin{pmatrix} p_{1,1} & p_{1,2} & p_{1,3} \\ p_{2,1} & p_{2,2} & p_{2,3} \\ p_{3,1} & p_{3,2} & p_{3,3} \end{pmatrix}$$

This covariance matrix makes it possible to extract the covariance matrix $P_{NE}$ of the position error in the horizontal plane:

$$P_{NE} = \begin{pmatrix} p_{1,1} & p_{1,2} \\ p_{2,1} & p_{2,2} \end{pmatrix}$$

The method 200 finally comprises a step 260 of computing, based on the covariance matrix of the position error in the geographical reference frame, the radius of a circle centred around the estimated position of the aircraft and within which the actual position of the aircraft is located with a probability equal to or greater than a predefined threshold.

This radius, also called protection radius or "HIL", makes it possible to define a circle, centered around the estimated position of the aircraft, within which it is possible to guarantee that the actual position of the aircraft is located, with a predefined probability. This therefore makes it possible to satisfy the constraints of RNP navigation, even when satellite geolocation is not available.

In one set of embodiments, this step consists in:
for each radio transmitter of index i:
performing all of steps 230 to 250 with the system of equations in which the equation linking the position of the aircraft and the positions of said radio transmitters has been removed, in order to obtain an estimated position $\tilde{X}_{ined}$ and a covariance matrix of the position error $P_{NEi}$ in the horizontal plane not taking into account said radio transmitter of index i;
computing a difference $dP_i = P_{NE} - P_{NE\ i}$ between the covariance matrix of the position error $P_{NE}$ in the horizontal plane and the covariance matrix of the position error $P_{NEi}$ in the horizontal plane not taking into account said radio transmitter of index i;
computing a distance $D_i$, in the horizontal plane, between the estimated position $\tilde{X}_{NE}$ of the aircraft and the estimated position $\tilde{X}_{NE_i}$ of the aircraft not taking into account said radio transmitter of index i;
computing a radius of said circle $HIL_i$ for said radio transmitter of index i, on the basis of said difference $dP_i$ and of said distance $D_i$;
computing the radius of said circle as the largest of said radii for each transmitter of index i: $HIL = \max(HIL_i)$.

This therefore consists in determining, for each real or virtual radio transmitter of index i, what the estimated position of the aircraft and the covariance matrix of the position in the horizontal plane would have been if the transmitter had not been taken into account. This therefore consists in performing all of steps 230 to 250, that is to say defining the matrix representing the system of equations, solving the system of equations, and converting the estimated position of the aircraft and the covariance matrix into the geographical reference frame, without the equation $D_i^2 = (x-x_i)^2 + (y-y_i)^2 + (z-z_i)^2$ linking the position of the aircraft to the position of the beacon of index i. The estimated position of the aircraft and the covariance matrix of the error in the horizontal plane without taking into account the beacon of index i are denoted $\tilde{X}_{ined}$ and $P_{NEi}$, respectively.

The difference $dP_i = P_{NE} - P_{NE\ i}$ between the covariance matrix of the position error $P_{NE}$ in the horizontal plane and the covariance matrix of the position error $P_{NEi}$ in the horizontal plane not taking into account said radio transmitter of index i, and the distance $\Delta_i = \|\tilde{X}_{NE} - \tilde{X}_{NE_i}\|$ in the horizontal plane between the position of the aircraft and the position of the aircraft without taking into account the transmitter of index i, are therefore indications of the error on the position: the greater they are, the less the distance computed between the radio transmitter of index i and the aircraft matches the distances computed between the aircraft and the other radio transmitters. This therefore makes it possible to determine a protection radius $HIL_i$ for a given radio transmitter. The largest of the protection radii $HIL = \max(HIL_i)$ is used as the overall protection radius of the aircraft.

In one set of embodiments of the invention, the protection radius $HIL_i$ for a radio transmitter of index i is computed by the following steps:
- computing the standard deviation of the difference between the covariance matrix of the position error $P_{NE}$ in the horizontal plane and the covariance matrix of the position error $P_{NEi}$ in the horizontal plane not taking into account said radio transmitter of index i: $\sigma_i = \max(\lambda(dP_i))$ in which $(\lambda(dP_i))$ is the vector of eigenvalues of the matrix $dP_i$, and the function max( ) is a function returning the largest of the elements of the matrix;
- computing a threshold $TH_i = T*\sigma_i$, where T is a predefined constant;
- if $\Delta_i < TH_i$, that is to say if the distance $\Delta_i$ in the horizontal plane between the position of the aircraft and the position of the aircraft without taking into account the transmitter of index i is lower than said threshold $TH_i$, the protection radius for the radio transmitter of index i is computed as $HIL_i = TH_i + k\sqrt{\max(\lambda(P_{NEi}))}$, where k is a constant, and $\lambda(P_{NE\ i})$ is the vector of eigenvalues of the covariance matrix of the position error $P_{NEi}$ in the horizontal plane not taking into account said radio transmitter of index i;
- if not (if $\Delta_i \geq TH_i$), the protection radius for the radio transmitter of index i is computed as $HIL_i = \Delta_i + k\sqrt{\max(\lambda(P_{NEi}))}$.

The first and second constants T and k make it possible to calibrate the computations, in order to obtain the protection radius with a given precision, that is to say that choosing them makes it possible to compute a protection radius HIL and certify that the true position of the aircraft is located within the sphere of radius HIL around the estimated position of the aircraft, with a given probability.

In one set of embodiments of the invention, the first and second constants T and k are determined using the distribution law of $\chi^2$, giving a probability of false alarm and probability of non-detection that make it possible to characterize the performance of the system.

More specifically, T and k may be determined by:

$$T^2 = F^{-1}\left(1 - \left(\frac{PFA}{m}\right), 1\right) = \left\{T^2 : F(T^2, 1) = \frac{PFA}{m}\right\}$$

$$k^2 = F^{-1}(1 - PMD, 1)$$

in which:
F is the probability density function of a distribution $\chi^2$ of degree 1;
m is the number of real or virtual radio transmitters used;
PFA is the value of the target probability of false alarms; It depends on the need for availability that is expected from the positioning system, a false alarm leading to the system no longer being used while it could still be used.
PND is the value of the desired target probability of missed detections. It depends on the risk of integrity sought on the final position, and on the probability of undetected failures of the system providing the measurements used for positioning.

Pre-computing the two constants T and k thus makes it possible to certify that the true position of the aircraft is indeed located within the sphere of radius HIL around the estimated position of the aircraft, with a target probability.

The invention thus makes it possible to determine the position of an aircraft, and the associated protection radius, in order to satisfy RNP navigation conditions, even when GNSS positioning is not accessible.

This position determination method may be implemented directly in the FMS, for example within the module LOC-NAV 170.

The position and the protection radius may also be computed by a computer outside the FMS. In this case, the FMS also computes a position of the aircraft. In this case, the position for RNP navigation may stay as the position computed by the FMS, and the protection radius is increased by the distance between the estimated position of the aircraft computed by the method 200 and the position computed by the FMS.

The method may thus be implemented without modifying the architecture of the FMS, by taking an additional safety margin, due to the difference between the position computed by the FMS and the position computed via the method 200.

The above examples demonstrate the ability of the invention to determine a position of an aircraft associated with a protection radius, even when GNSS positioning is not available. However, they are only given by way of example and in no way limit the scope of the invention as defined in the claims below.

The invention claimed is:

1. A method implemented in an aircraft comprising at least one computer, the aircraft comprising a flight management system for determining a flight plan associated with a trajectory to be followed by an aircraft, the flight management system comprising one or more databases, wherein the method comprises:
    a first step of obtaining, by said at least one computer, distances of the aircraft from at least four radio transmitters each having a fixed position in a geographical reference frame;
    a second step of converting, by said at least one computer, the positions of the radio transmitters into a terrestrial reference system;
    a third step of defining, by said at least one computer, in matrix form, a system of redundant equations linking, in the terrestrial reference system, the position of the aircraft and the positions of the radio transmitters;
    a fourth step of solving, by said at least one computer, said system of equations, in order to obtain an estimated position of the aircraft and a covariance matrix of a position error in the terrestrial reference system;
    a fifth step of converting, by said at least one computer, the estimated position of the aircraft and the covariance matrix of the position error into the geographical reference frame; and
    a sixth step of computing, by said at least one computer, based on the covariance matrix of the position error in the geographical reference frame, a radius, said radius corresponding to the radius of a sphere centered around the estimated position of the aircraft and within which the actual position of the aircraft is located with a probability equal to or greater than a predefined threshold,
    wherein the flight management system uses said estimated position and said radius.

2. The method as claimed in claim 1, wherein the radio transmitters are radio beacons.

3. The method as claimed in claim 2, wherein the radio transmitters are distance measuring equipment (DME) radio beacons.

4. The method as claimed in claim 1, wherein:
    the aircraft has a position in the terrestrial reference system defined by a vector of coordinates (x, y, z);

each radio transmitter is defined by an index i, and has a position in the terrestrial reference system defined by a vector of 3 coordinates $(x_i, y_i, z_i)$;

the position of each radio transmitter is linked to the position of the aircraft by the equation $d_i^2 = (x-x_i)^2 + (y-y_i)^2 + (z-z_i)^2$.

5. The method as claimed in claim 4, wherein defining the system of redundant equations in matrix form consists in defining a system of equations in the form:

$$\underbrace{\begin{bmatrix} 1 & -2x_1 & -2y_1 & -2z_1 \\ 1 & -2x_2 & -2y_2 & -2z_2 \\ \vdots & \vdots & \vdots & \vdots \end{bmatrix}}_{H} \underbrace{\begin{bmatrix} x^2+y^2+z^2 \\ x \\ y \\ z \end{bmatrix}}_{X} = \underbrace{\begin{bmatrix} d_1^2 - x_1^2 - y_1^2 - z_1^2 \\ d_2^2 - x_2^2 - y_2^2 - z_2^2 \\ \vdots \end{bmatrix}}_{b}.$$

6. The method as claimed in claim 5, wherein the step of solving the system of equations uses a diagonal weighting matrix, comprising, for each distance measurement, an element of value equal to $$\frac{1}{2d_i \sigma_{d_i} + \sigma_{d_i}^2},$$

where:
$d_i$ represents the distance between the aircraft and the radio transmitter of index i;
$\sigma_{d_i}$ represents the standard deviation of the noise on the distance measurement $d_i$.

7. The method as claimed in claim 6, wherein the step of solving the system of equations consists in a singular value decomposition, a QR decomposition, or a Moore-Penrose pseudo-inverse solution.

8. The method as claimed in claim 5, wherein the system of redundant equations comprises the additional equation:

$$x^2 + y^2 + z^2 = (z_{bt} + R_E)^2$$

wherein:
$z_{bt}$ represents the altitude of the aircraft;
$R_E$ represents the Earth's radius, at the position of the aircraft;
and wherein defining the system of redundant equations in matrix form consists in defining a system of equations in the form:

$$\underbrace{\begin{bmatrix} 1 & -2x_1 & -2y_1 & -2z_1 \\ 1 & -2x_2 & -2y_2 & -2z_2 \\ \vdots & \vdots & \vdots & \vdots \\ 1 & 0 & 0 & 0 \end{bmatrix}}_{H} \underbrace{\begin{bmatrix} x^2+y^2+z^2 \\ x \\ y \\ z \end{bmatrix}}_{Xx} = \underbrace{\begin{bmatrix} d_1^2 - x_1^2 - y_1^2 - z_1^2 \\ d_2^2 - x_2^2 - y_2^2 - z_2^2 \\ \vdots \\ (z_{bt} + R_E)^2 \end{bmatrix}}_{b}.$$

9. The method as claimed in claim 4, wherein the system of redundant equations comprises the additional equation:

$$x^2 + y^2 + z^2 = (z_{bt} + R_E)^2$$

wherein:
$z_{bt}$ represents the altitude of the aircraft;
$R_E$ represents the Earth's radius, at the position of the aircraft.

10. The method as claimed in claim 1, wherein the sixth step consists in:
for each radio transmitter of index i:
performing all of the third to fifth steps with the system of equations wherein the equation linking the position of the aircraft and the positions of said radio transmitters has been removed, in order to obtain an estimated position and a covariance matrix of the position error in a horizontal plane not taking into account said radio transmitter of index i;

computing a difference between the covariance matrix of the position error in the horizontal plane and the covariance matrix of the position error in the horizontal plane not taking into account said radio transmitter of index i;

computing a distance, in the horizontal plane, between the estimated position of the aircraft and the estimated position of the aircraft not taking into account said radio transmitter of index i;

computing a radius of said sphere for said radio transmitter of index i, on the basis of said difference and of said distance; and computing the radius of said sphere as the largest of said radii for each transmitter of index i.

11. The method as claimed in claim 10, wherein the radius of said sphere for said radio transmitter of index i is computed by the following steps:

computing the standard deviation $\sigma_i$ of a matrix $dP_i$ of the differences between the covariance matrix of the position error in the horizontal plane and the covariance matrix of the position error in the horizontal plane not taking into account said radio transmitter of index i, by applying the formula $\sigma_i = \sqrt{\max(\lambda(dP_i))}$ wherein $(\lambda(dP_i))$ is the vector of eigenvalues of said difference matrix, and the function max( ) is a function returning the largest of the elements of the matrix;

computing a threshold $TH_i$ equal to the multiplication of said standard deviation $\sigma_i$ of the difference matrix $dP_i$ by a first predefined constant T;

if the distance $D_i$ in the horizontal plane between the position of the aircraft and the position of the aircraft without taking into account the transmitter of index i is lower than said threshold $TH_i$, computing the radius of said sphere for said radio transmitter of index i by applying the formula $TH_i + k\sqrt{\max(\lambda(P_{NEi}))}$, where k is a second predefined constant, and $\lambda(P_{NEi})$ is the vector of eigenvalues of the covariance matrix $P_{NEi}$ of the position error in the horizontal plane not taking into account said radio transmitter of index i;

if not, computing the radius of said sphere for said radio transmitter of index i by applying the formula $= D_i + k\sqrt{\max(\lambda(P_{NEi}))}$.

12. The method as claimed in claim 11, wherein:
the first predefined constant T is obtained by applying the formula:

$$T^2 = F^{-1}\left(1 - \left(\frac{PFA}{m}\right), 1\right) = \left\{T^2 : F(T^2, 1) = \frac{PFA}{m}\right\}$$

the second predefined constant k is obtained by applying the formula:

$$k^2 = F^{-1}(1 - PMD, 1)$$

wherein:
F is the probability density function of a distribution $\chi^2$ of degree 1;
m is the number of radio transmitters;
PFA is a target probability of false alarms for the detection of distance measurement errors;

PND is a desired target probability of missed detections of distance measurement errors.

13. The method as claimed in claim 1, additionally comprising obtaining a distance of the aircraft from a virtual radio transmitter based on an atmospheric pressure measurement performed by a barometer on board the aircraft.

14. The method as claimed in claim 13, wherein:
said virtual transmitter is located at the center of the Earth;
an altitude of the aircraft is evaluated based on the measurement of the atmospheric pressure;
the distance of the aircraft from the virtual radio transmitter is equal to the sum of the Earth's radius and the altitude of the aircraft.

15. A computer readable storage medium containing non-transitory instructions that, when executed by a computer, execute a method implemented in an aircraft comprising at least one computer, the aircraft comprising a flight management system for determining a flight plan associated with a trajectory to be followed by an aircraft, the flight management system comprising one or more databases, wherein the method comprises:
a first step of obtaining, by said at least one computer, distances of the aircraft from at least four radio transmitters each having a fixed position in a geographical reference frame;
a second step of converting, by said at least one computer, the positions of the radio transmitters into a terrestrial reference system;
a third step of defining, by said at least one computer, in matrix form, a system of redundant equations linking, in the terrestrial reference system, the position of the aircraft and the positions of the radio transmitters;
a fourth step of solving, by said at least one computer, said system of equations, in order to obtain an estimated position of the aircraft and a covariance matrix of a position error in the terrestrial reference system;
a fifth step of converting, by said at least one computer, the estimated position of the aircraft and the covariance matrix of the position error into the geographical reference frame; and
a sixth step of computing, by said at least one computer, based on the covariance matrix of the position error in the geographical reference frame, a radius, said radius corresponding to the radius of a sphere centered around the estimated position of the aircraft and within which the actual position of the aircraft is located with a probability equal to or greater than a predefined threshold,
wherein the flight management system uses said estimated position and said radius.

16. A system implemented in an aircraft comprising: at least a computer and a flight management system, wherein the system is configured to execute a method implemented in an aircraft for determining a flight plan associated with a trajectory to be followed by an aircraft, the flight management system comprising one or more databases, wherein the method comprises:
a first step of obtaining, by said at least one computer, distances of the aircraft from at least four radio transmitters each having a fixed position in a geographical reference frame;
a second step of converting, by said at least one computer, the positions of the radio transmitters into a terrestrial reference system;
a third step of defining, by said at least one computer, in matrix form, a system of redundant equations linking, in the terrestrial reference system, the position of the aircraft and the positions of the radio transmitters;
a fourth step of solving, by said at least one computer, said system of equations, in order to obtain an estimated position of the aircraft and a covariance matrix of a position error in the terrestrial reference system;
a fifth step of converting, by said at least one computer, the estimated position of the aircraft and the covariance matrix of the position error into the geographical reference frame; and
a sixth step of computing, by said at least one computer, based on the covariance matrix of the position error in the geographical reference frame, a radius, said radius corresponding to the radius of a sphere centered around the estimated position of the aircraft and within which the actual position of the aircraft is located with a probability equal to or greater than a predefined threshold,
wherein the flight management system uses said estimated position and said radius.

* * * * *